United States Patent [19]
Beck et al.

[11] Patent Number: 5,763,873
[45] Date of Patent: Jun. 9, 1998

[54] PHOTODETECTOR CIRCUIT FOR AN ELECTRONIC SPRAYER

[75] Inventors: James L. Beck, Los Gatos; Malcolm L. Kinter, Sunnyvale, both of Calif.

[73] Assignee: Patchen, Inc., Los Gatos, Calif.

[21] Appl. No.: 705,381

[22] Filed: Aug. 28, 1996

[51] Int. Cl.$^6$ ................................................ H01J 40/14
[52] U.S. Cl. ...................... 250/214 B; 350/59; 350/308; 327/561
[58] Field of Search ................. 250/214 B, 214 AL, 250/214 C, 214 A, 214 LA, 214 R, 226; 327/561; 331/117 R; 330/59, 109, 294, 308; 356/402, 407, 420

[56] References Cited

U.S. PATENT DOCUMENTS

| | | | |
|---|---|---|---|
| 2,514,405 | 7/1950 | Marihart | 250/239 |
| 2,682,132 | 6/1954 | Marihart | 47/1 |
| 2,894,178 | 7/1959 | Chesebrough et al. | 317/130 |
| 3,373,870 | 3/1968 | Black et al. | 209/111.6 |
| 3,488,511 | 1/1970 | Mori et al. | 250/226 |
| 3,512,587 | 5/1970 | Shader | 172/57 |
| 3,590,925 | 7/1971 | Troutner | 176/6 |
| 3,609,913 | 10/1971 | Rose | 47/1.43 |
| 3,652,844 | 3/1972 | Scott, Jr. | 240/1 |
| 3,701,218 | 10/1972 | Priest | 47/1.43 |
| 3,821,550 | 6/1974 | Priest | 250/226 |
| 3,910,701 | 10/1975 | Henderson et al. | 356/39 |
| 4,013,875 | 3/1977 | McGlynn | 235/150.2 |
| 4,015,366 | 4/1977 | Hall, III | 47/1 |
| 4,029,391 | 6/1977 | French | 350/96 |
| 4,092,800 | 6/1978 | Wayland, Jr. et al. | 47/1.3 |
| 4,179,216 | 12/1979 | Theurer et al. | 356/4 |
| 4,206,569 | 6/1980 | Randolph | 47/1.7 |
| 4,354,339 | 10/1982 | Nokes | 56/10.2 |
| 4,369,886 | 1/1983 | Lane et al. | 209/564 |
| 4,482,960 | 11/1984 | Pryor | 364/424 |
| 4,527,897 | 7/1985 | Okabe | 356/407 |
| 4,550,526 | 11/1985 | Smucker | 47/1.5 |
| 4,558,786 | 12/1985 | Lane | 209/558 |
| 4,618,257 | 10/1986 | Bayne et al. | 356/71 |
| 4,626,678 | 12/1986 | Morita et al. | 330/59 |
| 4,626,993 | 12/1986 | Okuyama et al. | 364/424 |
| 4,628,454 | 12/1986 | Ito | 364/424 |

(List continued on next page.)

FOREIGN PATENT DOCUMENTS

| | | |
|---|---|---|
| 231270 | 11/1984 | Germany . |
| 229625 | 6/1989 | New Zealand . |
| 203340 | 12/1967 | U.S.S.R. . |
| 471074 | 6/1973 | U.S.S.R. . |
| 382367 | 8/1973 | U.S.S.R. . |
| 547 183 | 4/1977 | U.S.S.R. . |
| 590598 | 7/1947 | United Kingdom . |
| 2 200 446 | 8/1988 | United Kingdom . |

OTHER PUBLICATIONS

Proceedings of the 1991 Symposium, American Society of Agricultural Engineers, W. L. Felton et al., "*A Microprocessor Controlled Technology To Selectively Spot Spray Weeds*", 8 pages (Dec. 16–17 1991).

B. B. Nitsch et al., "*Visible And Near Infrared Plant, Soil And Crop Residue Reflectivity For Weed Sensor Design*", American Society of Agricultural Engineers, Jun. 23–26, 1991).

(List continued on next page.)

Primary Examiner—Edward P. Westin
Assistant Examiner—John R. Lee
Attorney, Agent, or Firm—Skjerven, Morrill, MacPherson, Franklin & Friel

[57] ABSTRACT

An agricultural implement for spraying herbicide on weeds in a field without spraying herbicide on bare soil includes a photodetector circuit. The photodetector circuit includes a photodetector and an active filter. The photodetector is not AC coupled in parallel with an inductor/capacitor resonant circuit which tunes the active filter. As a result, changes in photodetector capacitance due to changes in ambient lighting conditions are not impressed across the resonant inductor/capacitor circuit and therefore do not adversely change the frequency and phase characteristics of the photodetector circuit.

15 Claims, 9 Drawing Sheets

U.S. PATENT DOCUMENTS

| | | | |
|---|---|---|---|
| 4,630,773 | 12/1986 | Ortlip | 239/1 |
| 4,674,048 | 6/1987 | Okumura | 364/424 |
| 4,699,273 | 10/1987 | Suggi-Liverani et al. | 209/580 |
| 4,709,265 | 11/1987 | Silverman et al. | 358/109 |
| 4,709,505 | 12/1987 | Lempa, Jr. | 47/1.7 |
| 4,731,529 | 3/1988 | Ohsawa | 330/308 |
| 4,744,207 | 5/1988 | Hanley et al. | 56/16.6 |
| 4,768,713 | 9/1988 | Roper | 239/77 |
| 4,768,715 | 9/1988 | Sali et al. | 239/166 |
| 4,789,777 | 12/1988 | Takami et al. | 330/59 |
| 4,878,598 | 11/1989 | Ruschhaupt, Jr. | 222/1 |
| 4,991,341 | 2/1991 | Douglas | 47/1.7 |
| 5,015,868 | 5/1991 | Park | 250/561 |
| 5,021,645 | 6/1991 | Satula et al. | 250/223 |
| 5,050,771 | 9/1991 | Hanson et al. | 222/1 |
| 5,068,540 | 11/1991 | Tsuji | 250/561 |
| 5,072,128 | 12/1991 | Hayano et al. | 250/572 |
| 5,099,113 | 3/1992 | Oi et al. | 250/214 B |
| 5,109,161 | 4/1992 | Horiuchi et al. | 250/561 |
| 5,144,767 | 9/1992 | McCloy et al. | 47/1.7 |
| 5,222,324 | 6/1993 | O'Neall et al. | 47/1.7 |
| 5,237,386 | 8/1993 | Harley | 356/338 |
| 5,278,423 | 1/1994 | Wangler et al. | 250/561 |
| 5,296,702 | 3/1994 | Beck et al. | 250/226 |
| 5,319,196 | 6/1994 | Cleven | 250/231.13 |
| 5,386,285 | 1/1995 | Asayama | 356/356 |
| 5,389,781 | 2/1995 | Beck et al. | 250/226 |
| 5,481,104 | 1/1996 | Miller et al. | 250/214 B |
| 5,507,115 | 4/1996 | Nelson | 47/1.7 |
| 5,585,626 | 12/1996 | Beck et al. | 250/222.1 |
| 5,650,748 | 7/1997 | Johnston et al. | 327/561 |
| 5,670,775 | 9/1997 | Abraham et al. | 330/59 |

OTHER PUBLICATIONS

Geoffrey J. Shropshire et al., *"Fourier and Hadamard Transforms For Detecting Weeds in Video Images"*, pp. 1–18, American Society of Agricultural Engineers, (Dec. 12–15, 1989).

Geoffrey J. Shropshire et al., *"Optical Reflectance Sensor for Detecting Plants"*, SPIE vol. 1379, pp. 222–235, (1990). no month.

*"Sucker Punch"*, California Farmer, p. 18 (Feb. 1995).

*"A New Age of Weed Control"*, Kelly Baron, The Grower, pp. 20–24 (Feb. 1993).

Patchen On Target, 4 pages (Fall 1994). (no month).

*"The Newest Weedseeker is a Hit"*, Patchen On Target, 4 pages, (Spring 1995). (no month).

*"Waging War on Weeds"*, Grape Grower, Marni Katz, vol. 27, No. 9, 4 pages (Sep. 1995).

Patchen On Target, 4 pages, (Winter 1993). (no month).

Patchen On Target, 4 pages (Spring 1994). (no month).

Patchen Selective Spray Systems, *"Reduced Herbicide Usage is Perennial Crops, Row Crops, Fallow Land and Non–Agricultural Applications Using Optoelectronic Detection"*, 10 pages, (1994).

KEY TO FIG. 9

| 9A | 9B |

PHOTODETECTOR CIRCUIT FOR AN ELECTRONIC SPRAYER

BACKGROUND INFORMATION

FIG. 1 (Prior Art) is a graph illustrating spectral reflectance versus wavelength for soil 1 and a living plant 2. Due to the differences between spectral reflectance characteristics, it is possible to differentiate living plants from bare soil. Light beams of two different wavelengths (for example, 670 nm and 750 nm) are transmitted toward, and consequently scattered off of, an object in a field (e.g., a plant or soil). The intensities of the different wavelengths of scattered light returning from the object are compared to determine the whether the object is a plant or soil. For example, if the intensity values of the scattered light are consistent with the spectral reflectance characteristics of a plant, then the object from which the beams are scattered is assumed to be a plant.

The foregoing method may be used advantageously to reduce the amount of herbicide required to eradicate weeds. For example, a field containing weeds may be scanned using light beams of two different wavelengths as described above. Each time the spectral reflectance characteristic of a weed is detected, a solenoid valve is opened so that herbicide is sprayed directly onto the weed. A considerable savings in herbicide may result because herbicide is not sprayed unnecessarily onto bare soil. For further details, see U.S. Pat. No. 5,296,702 and U.S. patent application Ser. No. 08/276,002, each filed 15 Jul. 1994, now U.S. Pat. No. 5,585,626, each of which is incorporated herein by reference.

FIG. 2 (Prior Art) is a diagram of one embodiment of an electronic sprayer. A first diode 3 emits light of a first wavelength (e.g., 750 nm) and a second diode 4 emits light of a second wavelength (e.g., 670 nm). The drive currents of diode 3 and diode 4 are each modulated with respective modulation signals MA and MB, which are of the same frequency but of different phase.

Light from diodes 3 and 4 passes through an emitter lens 5 and is thereby focussed on an object (in this case a weed 6). Light scattered from weed 6 passes through a detector lens 7 and an aperture plate 8 to impinge upon a photodetector 9. A resonant circuit 10 is tuned to the frequency of modulation signals MA and MB.

The phase of the scattered light impinging upon photodetector 9 is used to assess the spectral reflectance characteristic of the scattered light, and therefore to characterize the object (e.g., plant or soil) from which the light is scattered. For example, if the light from diode 4 were completely absorbed by weed 6, then the only light received by photodetector 9 would be from diode 3. Photodetector 9 would therefore be modulated with a modulation signal approximately in phase with the modulation signal MA driving diode 3.

If, on the other hand, no light from diode 3 scattered from weed 6, then the only light received by photodetector 9 would be from diode 4. Consequently, the oscillation induced in resonant circuit 10 would have a second phase relationship with respect to the phase of the modulation signal MA used to the drive diode 3.

The foregoing examples represent the extreme cases. In practice, photodetector 9 typically receives some light from each of diodes 3 and 4. Then, depending on the relative reflectance values, the phase of resonant circuit 10 will lie between the first and second extreme phase relationships described above.

A phase detector detects the phase of the oscillation induced in resonant circuit 10, providing phase information indicative of the relative strengths of the scattered light beams from diodes 3 and 4. If this phase information is consistent with the spectral reflectance characteristic of a weed, then a solenoid valve 11 is opened to spray herbicide onto weed 6. Conversely, if the phase information is consistent with the spectral reflectance characteristic of soil, then solenoid valve 11 remains closed.

The ability of the electronic sprayer to distinguish plants from soil depends upon the accuracy of resonant circuit 10. It is therefore important that the frequency and phase of resonant circuit 10 remain stable as the electronic sprayer moves across a field.

FIG. 3 (Prior Art) is a simplified diagram of a photodetector amplifier circuit 12 used to receive scattered light. Tuned resonant circuit 10 includes an inductor 13 and a capacitor 14 connected in parallel between ground potential and the gate of a field effect transistor 15. Transistor 15 and resistors 16 and 17 form an amplifier having an output terminal $V_{OUT}$.

At low frequencies, inductor 13 of tuned circuit 10 forms a low-impedance path from the gate of transistor 15 to ground, thereby reducing the gain of the amplifier. At high frequencies, capacitor 14 of the tuned circuit 10 forms a low-impedance path from the gate of transistor 15 to ground, once again reducing the gain of the amplifier. The amplifier exhibits maximum gain at an intermediate frequency $f_o$ determined by the inductance of inductor 13 ($L_{13}$) and the capacitance of capacitor 14 ($C_{14}$) according to the following well-known relationship:

$$f_o = \frac{1}{2\pi \sqrt{L_{13} C_{14}}} \qquad \text{(EQ. 1)}$$

Intermediate frequency $f_o$ is selected to correspond with the frequency of the modulation signals MA and MB. Radiation A from diode 3 increases the magnitude of the reverse-bias current through photodetector 18. This current flows through resistor 19 and photodetector 18 to the node at the gate of transistor 15. (Resistor 20, typically 10 KΩ to 20 KΩ, is provided to reduce the quality factor of the amplifier so that the amplifier is less sensitive to noise, supply-voltage variations, and temperature variations.) The on-off modulation of radiation A due to the modulation signal MA causes the voltage on the gate of transistor 15 to oscillate at the frequency of the modulation signal MA (for example, 455 Khz). The phase of the oscillation is dependent upon the phase of the modulation signal MA. If photodetector 18 receives radiation from diode 4, then the voltage on the gate of transistor 15 will oscillate at the same frequency; however, the phase of the oscillation will depend instead upon the phase of the modulation signal MB.

FIG. 4 (Prior Art) shows that the maximum impedance of resonant circuit 10 occurs at 455 Khz. Consequently, the $f_o$ of photodetector circuit 12 is also 455 Khz. It was discovered however that the intermediate frequency $f_o$ of photodetector circuit 12 changes when ambient light is incident on photodetector 18. Curves 21 and 22 represent the respective impedance of resonant circuit 10 with and without ambient sunlight impinging upon photodetector 18.

Also shown in FIG. 4, shining sunlight on photodetector 18 shifts the phase (from phase curve 23 to phase curve 24) of resonant circuit 10. Such phase shifts are undesirable because, as explained above, the phase of scattered light impinging upon photodetector 9 is used to characterize objects from which the light is scattered. Consequently, phase errors due to changes in ambient light degrade the ability of the electronic sprayer to distinguish plants from soil. There is therefore a need for a photodetector circuit that is insensitive to changes in the level of ambient light.

SUMMARY

An agricultural implement for spraying herbicide on weeds in a field without spraying herbicide on the bare soil includes a photodetector circuit. The photodetector circuit includes a photodetector and an active filter. The photodetector is not AC coupled in parallel with an inductor/capacitor resonant circuit that tunes the active filter. As a result, changes in photodetector capacitance due to changes in ambient lighting conditions are not impressed across the resonant inductor/capacitor circuit, and therefore do not adversely change the frequency and phase characteristics of the photodetector circuit.

This summary does not purport to define the invention. The invention is defined by the claims.

DETAILED DESCRIPTION

Figure 5:
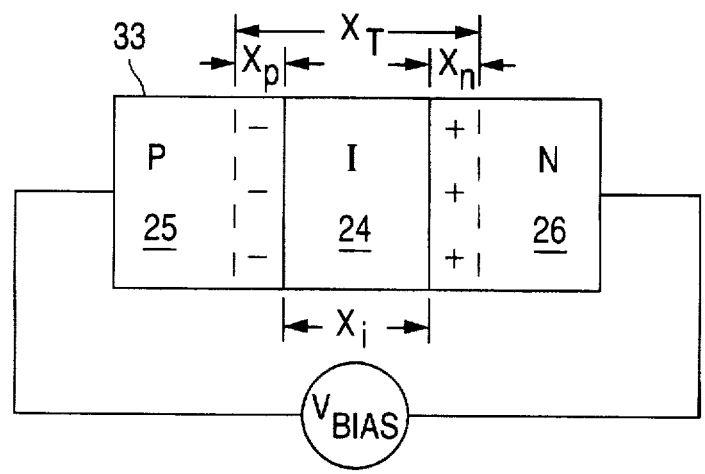
FIG. 5 is a cross-sectional diagram of a photodiode.

FIG. 5 is a cross-sectional diagram of a photodiode 23, which conventionally includes an intrinsic layer 24 sandwiched between a p-type layer 25 and an n-type layer 26, is used to explain the operation of photodetector 18. A depletion region extends a distance $x_P$ into layer 25 and a distance $X_N$ into layer 26.

As is well known, if voltage $V_{BIAS}$ is negative (i.e., if diode 23 is reverse biased), the sum of the depletion depths $(x_P+x_N)$ increases. Conversely, if bias voltage $V_{BIAS}$ is positive (i.e. if diode 23 is forward biased), the sum $x_P+x_N$ decreases. This relationship between the bias voltage $V_{BIAS}$ the sum of the depletion depths may be expressed as:

$$x_P+x_N=K(\phi_I-V_{BIAS})^n \qquad \text{(EQ. 2)}$$

where $\phi_I$ is the built-in potential of a p-n junction, n is a number typically ranging from one-third to one-half, and K is a constant for a given p-n junction.

Photodiodes exhibit a capacitance that varies with the depth of the total non-conductive region $x_T$. This well-known relationship may be expressed as follows:

$$C=\frac{\epsilon_s A}{x_T} \qquad \text{(EQ. 3)}$$

where A is the junction area and $\epsilon_s$ is the permittivity of silicon.

Combining equations 2 and 3 produces equation 4 below, which makes clear that because the depletion depth $x_N+x_P$ varies with the bias voltage $V_{BIAS}$, so too does the capacitance C vary with the voltage $V_{BIAS}$.

$$C=\frac{A\epsilon_s}{K(\phi_i-V_{bias})^n+x_i} \qquad \text{(EQ. 4)}$$

Based on the relationship expressed in equation 4, a theory was devised to explain why changes in ambient light affected the tuned frequency of photodetector circuit 12. The basic theory is as follows:

1. changes in ambient light on photodetector 18 change the voltage applied across photodetector 18;
2. because photodetector 18 is a diode, changes in voltage across photodetector 18 change the capacitance $C_{PD}$ of photodetector 18 (equation 4); and
3. changes in the capacitance CPD of photodetector 18 change the resonant frequency of photodetector circuit 12.

Based on this theory, it was supposed that holding the voltage across the photodetector 18 constant would keep the capacitance $C_{PD}$ of photodetector 18 constant, and would therefore prevent the natural frequency of resonant circuit 10, and therefore photodetector circuit 12, from varying with changes in ambient light. Resistor 19 was therefore removed.

Figure 3:
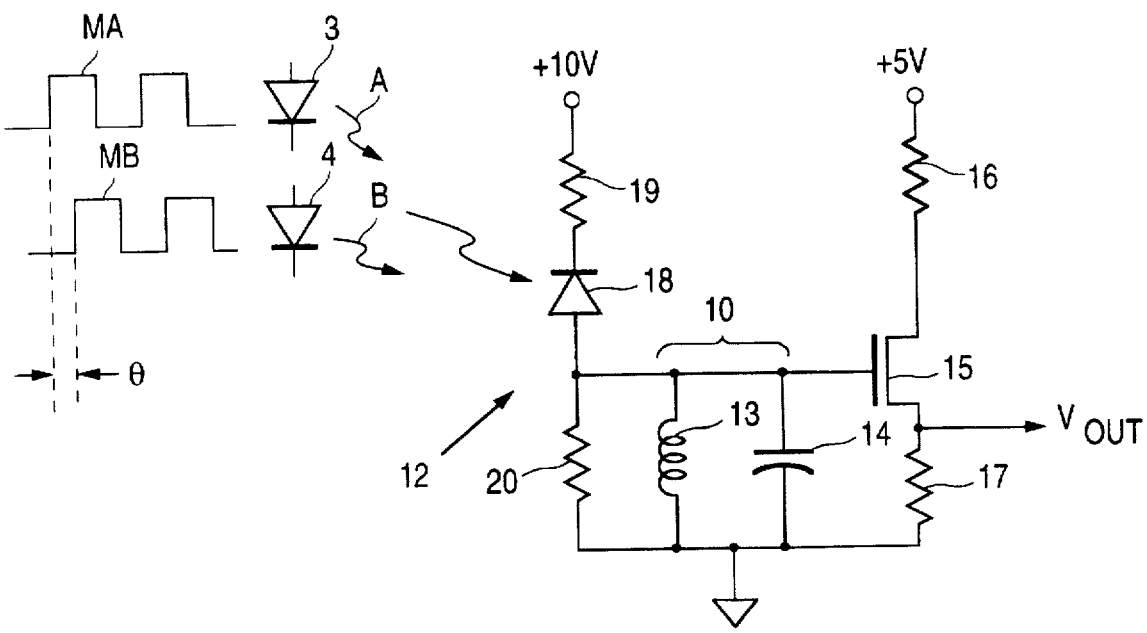
FIG. 3 (Prior Art) is a simplified diagram of a photodetector amplifier circuit used to receive radiation scattered from an object in a field.
Figure 6:
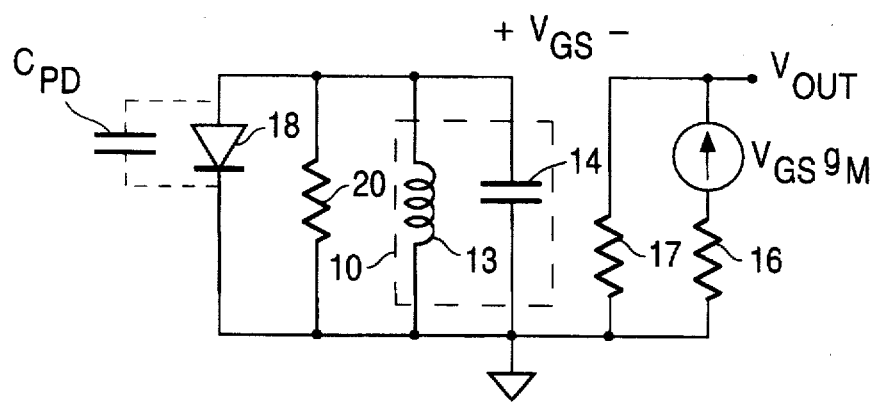
FIG. 6 is an AC model of part of the photodetector circuit of FIG. 3.

FIG. 6 is an AC model of a portion of photodetector circuit 12 of FIG. 3. The ten-volt power supply (not shown) connected to the +10 volt terminal of FIG. 3 is effectively an AC ground. As a result, the series-connected photodetector 18 and dequeuing resistor 19 are shown in FIG. 6 connected in parallel with the resonant inductor 13 and capacitor 14. Resistor 19 is removed so that the voltage across diode 18 remains constant. Unfortunately, even with the voltage across diode 18 held constant, sunlight incident on photodetector 18 still affects the resonant frequency of photodetector circuit 12.

It is now believed that capacitance $C_{PD}$ of the photodetector 18 can change even if the voltage across photodetector 18 remains constant, and that such changes in the capacitance $C_{PD}$ of photodetector 18 affect the resonant frequency of resonant circuit 10 when sunlight is incident on photodetector 18.

Figure 7A:
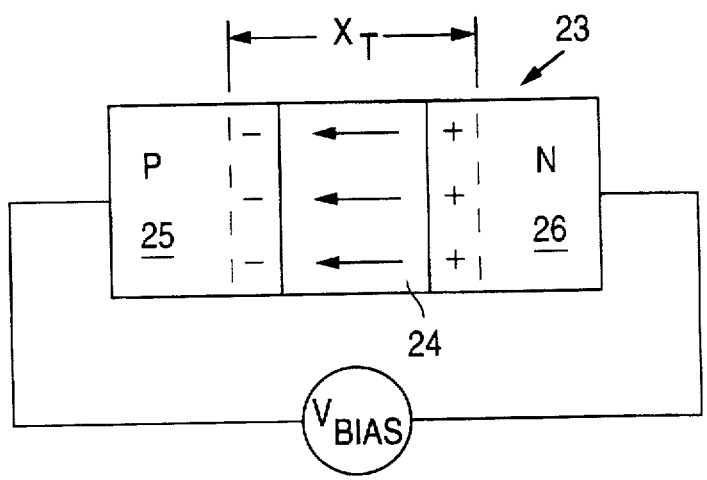
FIGS. 7a, 7b, and 7c depict the action of photogenerated charge carriers in a conventional photodiode.

FIG. 7a is another cross-sectional diagram of photodiode 23 of FIG. 5. Arrows conventionally represent an electric field induced by voltage source $V_{BIAS}$. The minus and plus signs represent the charge of the depletion regions in p-type layer 25 and the n-type layer 26, respectively.

It is well known that the voltage V across a distance x is equal to the integral of the electric field E over the distance x. State mathematically, $$V=-\int E \delta x \qquad \text{(EQ. 5)}$$

Thus, assuming that the voltage $V_{BIAS}$ is held constant and is applied across the total non-conductive region $x_T$, equation 5 requires that the integrated electric field (represented by the arrows) must also remain constant.

Figure 7B:
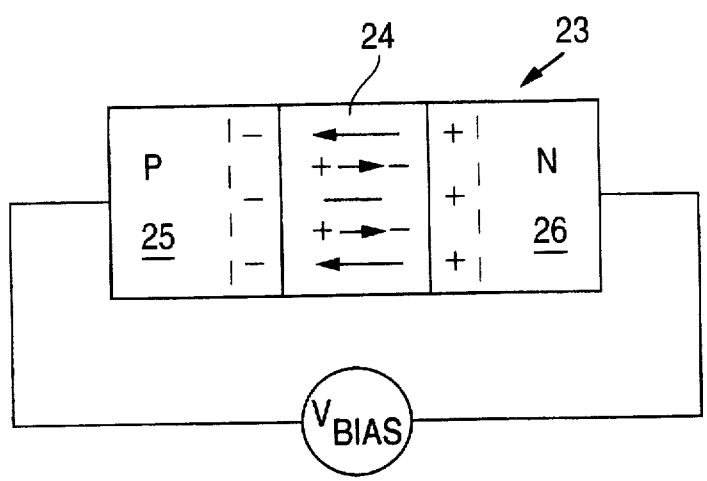

As is also well known, covalent bonds holding electrons at atomic sites within intrinsic layer 24 can be broken by incident radiant energy (photons). When such a bond is broken, both the freed electron and the vacancy created by its absence are able to move through intrinsic layer 24 as current carriers. Two pairs of these current carriers are illustrated in FIG. 7b. Because the current carriers are charged, they are swept through intrinsic layer 24 by the electric field: the negative current carrier is swept toward the positively charged n-type layer 26 and the positive current carrier is swept toward the negatively charged p-type layer 25.

Because the electric field tends to separate the current carriers, the average positions of the positive and negative charges generated in intrinsic layer 24 by photon bombardment become displaced relative to one another. Consequently, an excess of positive charge builds up toward the negatively charged p-type layer 25 and an excess of negative charge builds up toward the positively charged n-type layer 26. These charges generate between them an electric field (small arrows of FIG. 7b) that opposes the electric field (long arrows) applied across intrinsic layer 24. Consequently, the overall electric field within intrinsic layer 24 decreases.

Though the current carriers within intrinsic layer 24 decrease the electric field within intrinsic layer 24, the integral of the electric field must remain constant if the voltage applied across diode 23 remains constant (see equation 5). Thus, voltage source $V_{BIAS}$ supplies additional charge, as shown in FIG. 7c, to compensate for the charges within intrinsic layer 24.

Figure 7C:
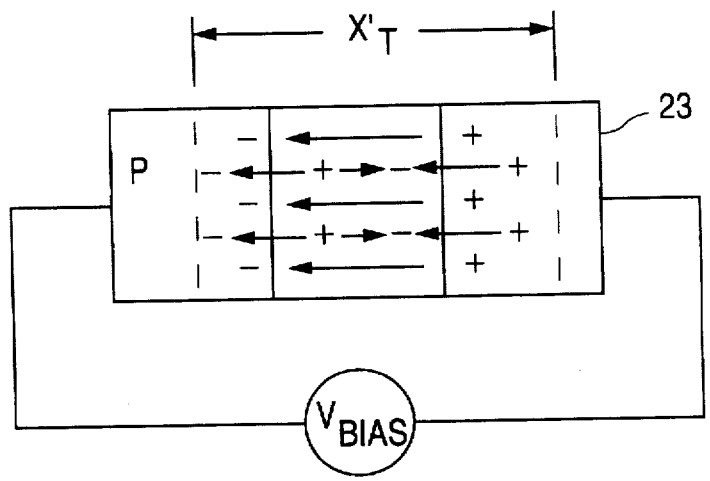

FIG. 7c shows additional positive and negative stored charge in regions 26 and 28, respectively, that compensate for the opposing electric field induced by the charges in intrinsic layer 24. As shown in FIG. 7c, the additional charges in the depletion regions of p-type layer 25 and n-type layer 26 widen each depletion region so that the total non-conductive region $x_T$ increase to $x_T'$. Restated, the depletion regions in each of layers 25 and 26 widen so that the integral of equation 5 is satisfied.

Figure 4:
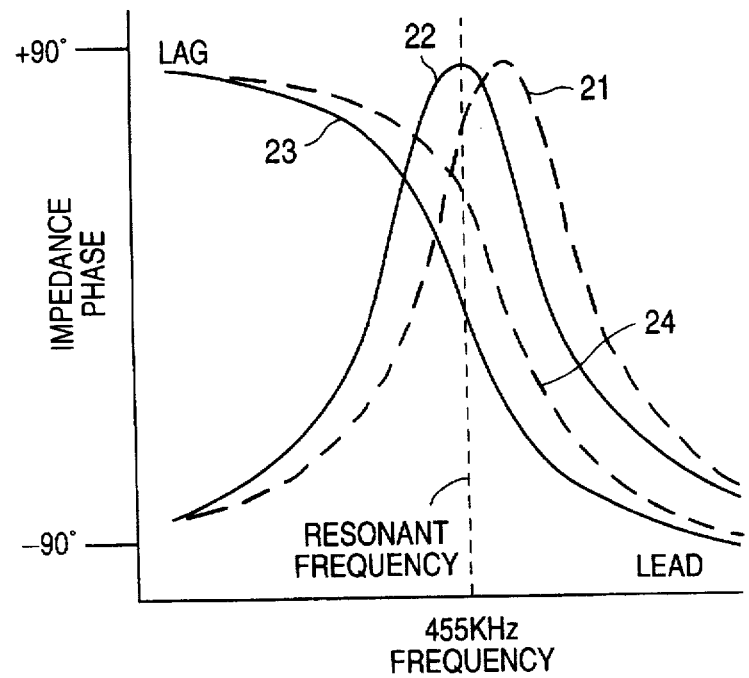
FIG. 4 (Prior Art) are graphs illustrating the impedance and phase response of the resonant circuit 10 of FIG. 3.

Returning to equation 3, increasing the width of the total non-conductive region from $x_T$ to $x_T'$ decreases the capacitance $C_{PD}$ of diode 23. Further, equation 1 provides that decreasing the capacitance of diode 23, if it were to effect the capacitance of resonant circuit 10, would increase the intermediate frequency $f_o$. Thus, the foregoing analysis of the effects of photons incident on diode 23 supports the empirically observed frequency and phase shifts illustrated in FIG. 4.

Figure 1:
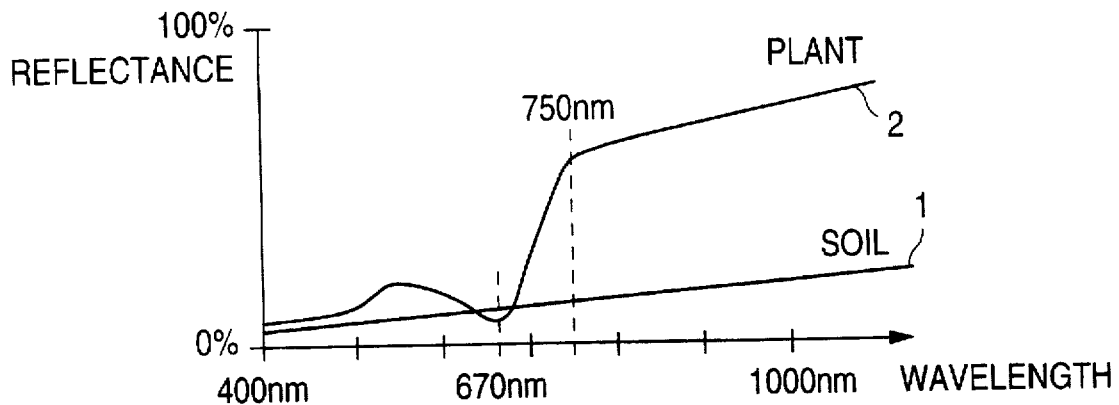
FIG. 1 (Prior Art) is a graph illustrating spectral reflectances representative of soil and a living plant.
Figure 8:
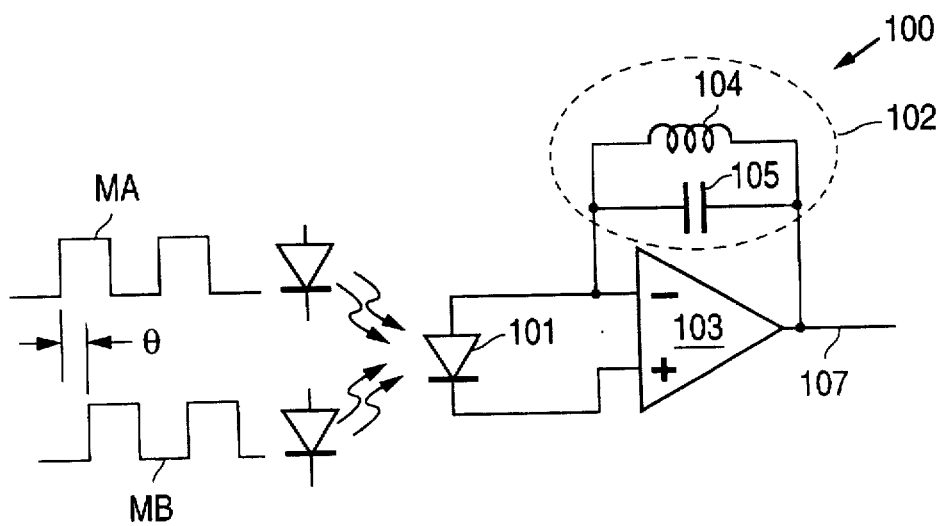
FIG. 8 is a simplified diagram of an embodiment of a photodetector circuit 100.
Figure 2:
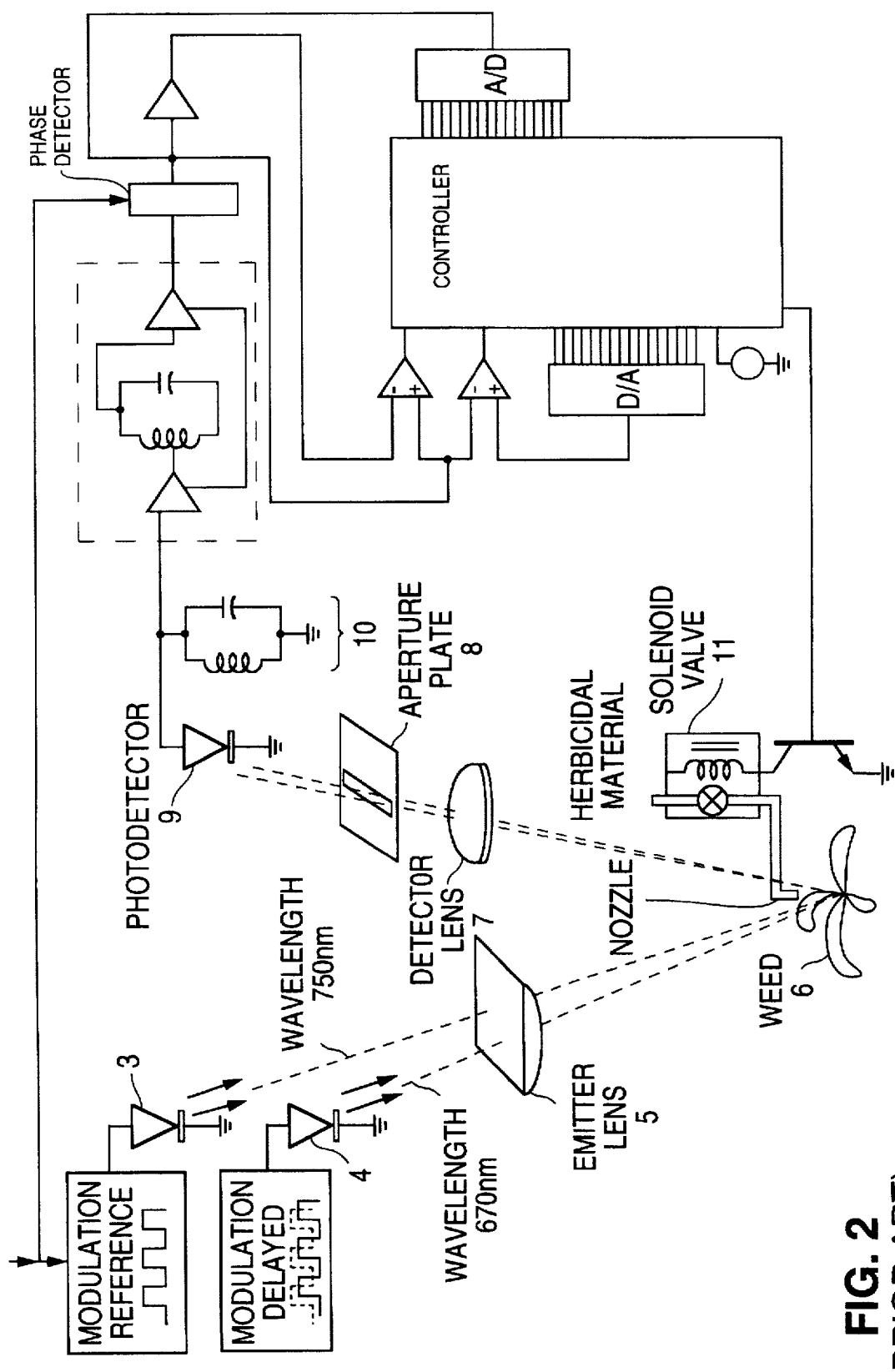
FIG. 2 (Prior Art) is a diagram of one embodiment of an electronic sprayer.

FIG. 8 is a simplified diagram of an embodiment of a photodetector circuit 100 in accordance with the present invention. A photodetector 101 is connected to a resonant inductor/capacitor circuit 102 and to an input terminal of an operational amplifier 103. To prevent changes in ambient lighting conditions from affecting the resonant frequency of circuit 102, the photodetector circuit 100 is configured so that photodetector 101 is not connected in parallel with circuit 102.

In the embodiment of FIG. 8, inductor/capacitor circuit 102 is connected in a negative feedback loop of an operational amplifier 103. The inductance of the inductor 104 and the capacitance of capacitor 105 are chosen to correspond with the frequency of the modulation signals MA and MB. In the AC model of the circuit of FIG. 8 (not shown), the output node 107, which is coupled to one end of the resonant inductor/capacitor circuit 102, is electrically isolated from the cathode of photodetector 101. Consequently, changes in the capacitance of photodiode 101 do not affect the capacitance of resonant inductor/capacitor circuit 102. In other embodiments, output node 107 is electrically isolated from the anode of diode 101. For example, diode 101 of FIG. 8 may be reversed so that the cathode is connected to the inverting input terminal of amplifier 103 and the anode is connected to the non-inverting input terminal. However, regardless of the configuration selected, diode 101 should not be connected in parallel with capacitor 105, so that any change in the capacitance of diode 101 will not affect the intermediate frequency of inductor/capacitor circuit 102. For proper electrical isolation between output node 107 and the cathode of photodetector 101, the amplitudes of any interfering signals from resonant inductor/capacitor circuit 102 developed across the input terminals of operational amplifier 103 are preferably at least six decibels (and preferable much more) below the amplitude of the signal developed across resonant inductor/capacitor circuit 102.

Figure 9A:
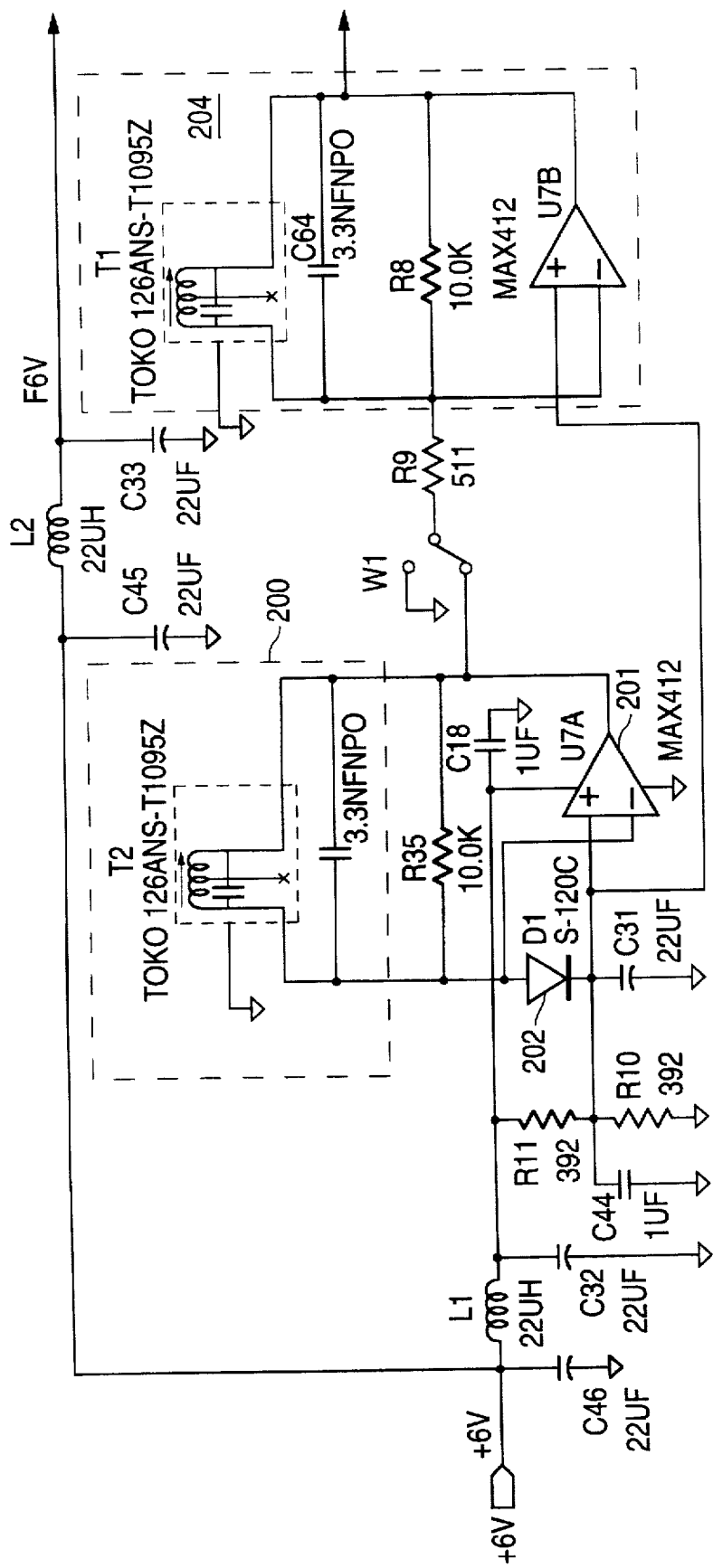
FIGS. 9a, 9b, 10a, and 10b are diagrams of other embodiments of photodetector circuits.
Figure 9B:
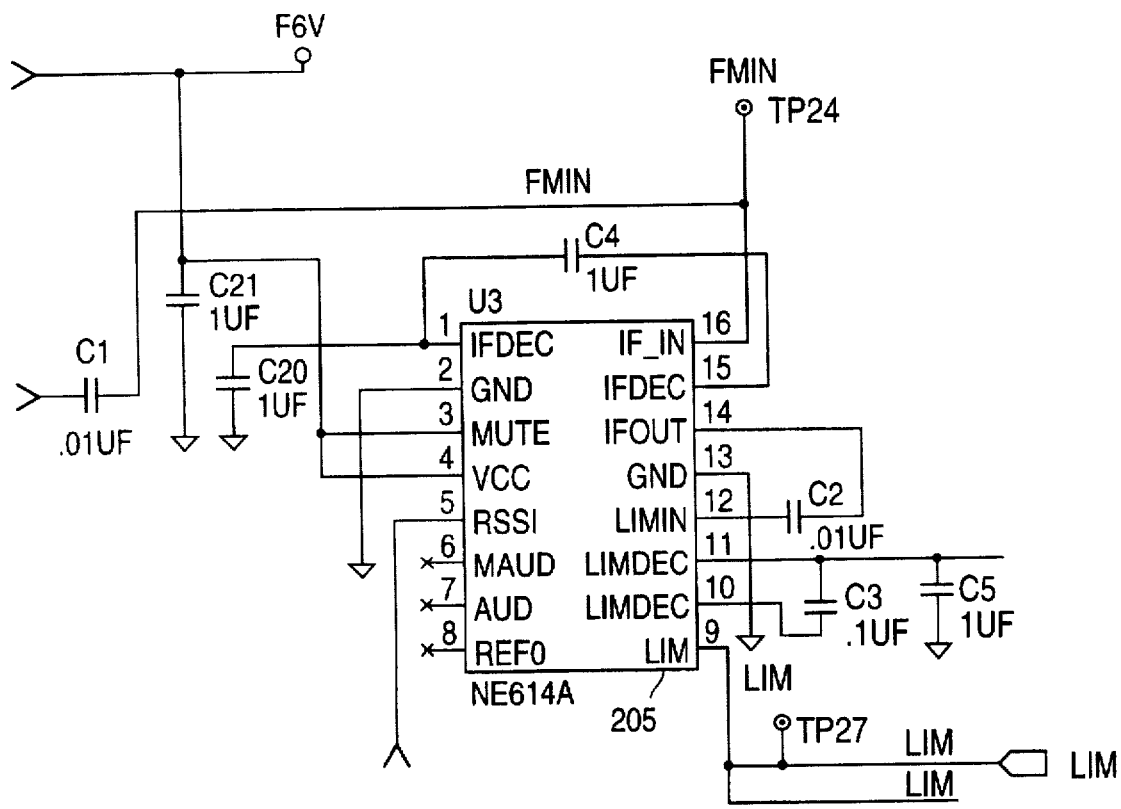

FIGS. 9A and 9B combined are a more detailed diagram of a photodetector circuit similar to photodetector circuit 100 of FIG. 8. The resonant inductor/capacitor circuit 200 in this embodiment is again connected in a negative feedback loop of an operational amplifier 201. A photodetector 202 is coupled between the inverting and non-inverting inputs of the operational amplifier 201. The signal output from operational amplifier 201 is filtered by an active bandpass filter 204. The filtered signal is supplied to an FM detector 205. In one embodiment, FM detector 205 is commercially available from Philips Semiconductor of Sunnyvale, Calif., as part number NE614A.

As with the circuit of FIG. 8, the output node of operational amplifier 201, which is coupled to one end of the resonant inductor/capacitor circuit 200, is electrically isolated from the cathode of photodetector 202.

Figure 10A:
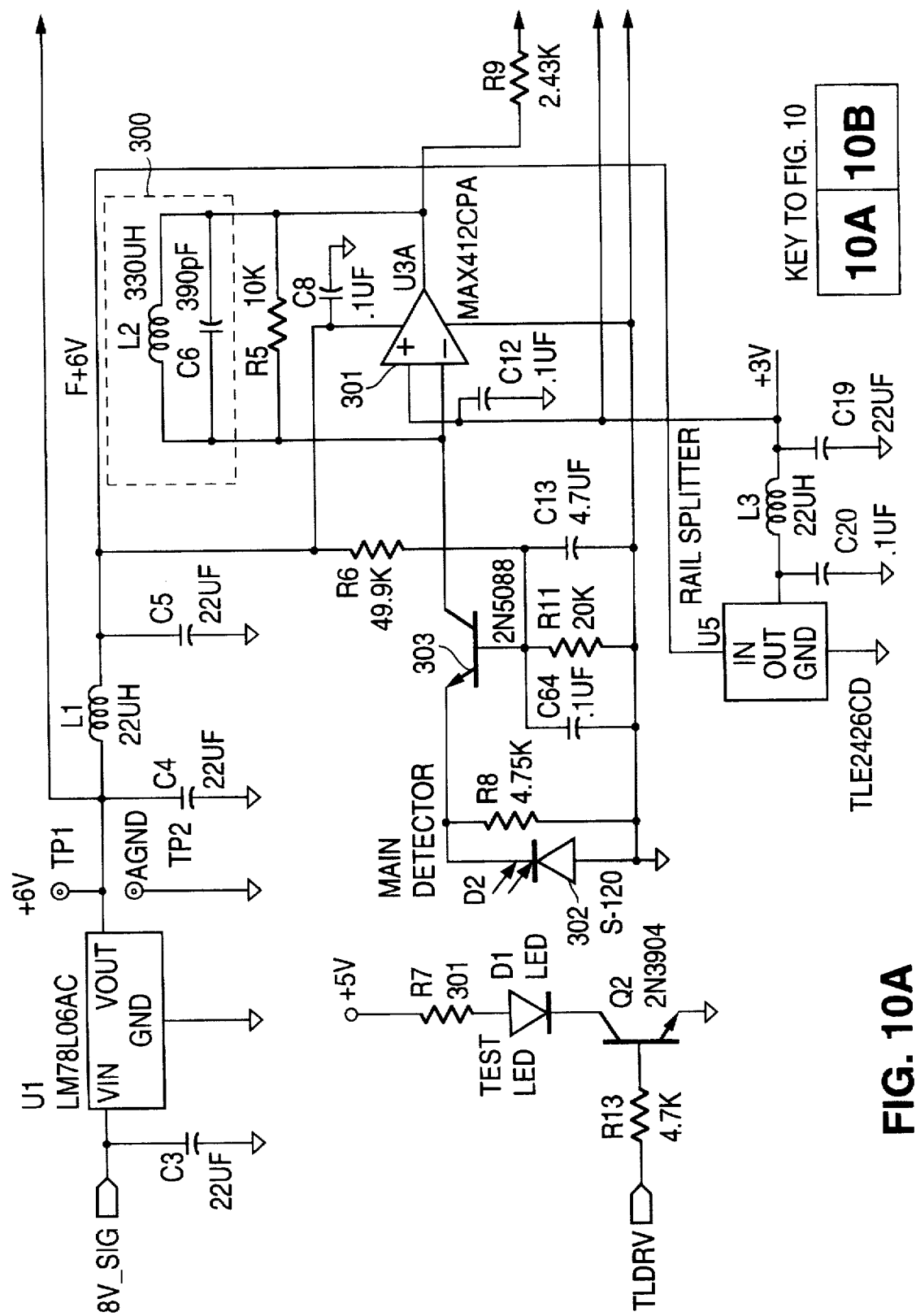
Figure 10B:
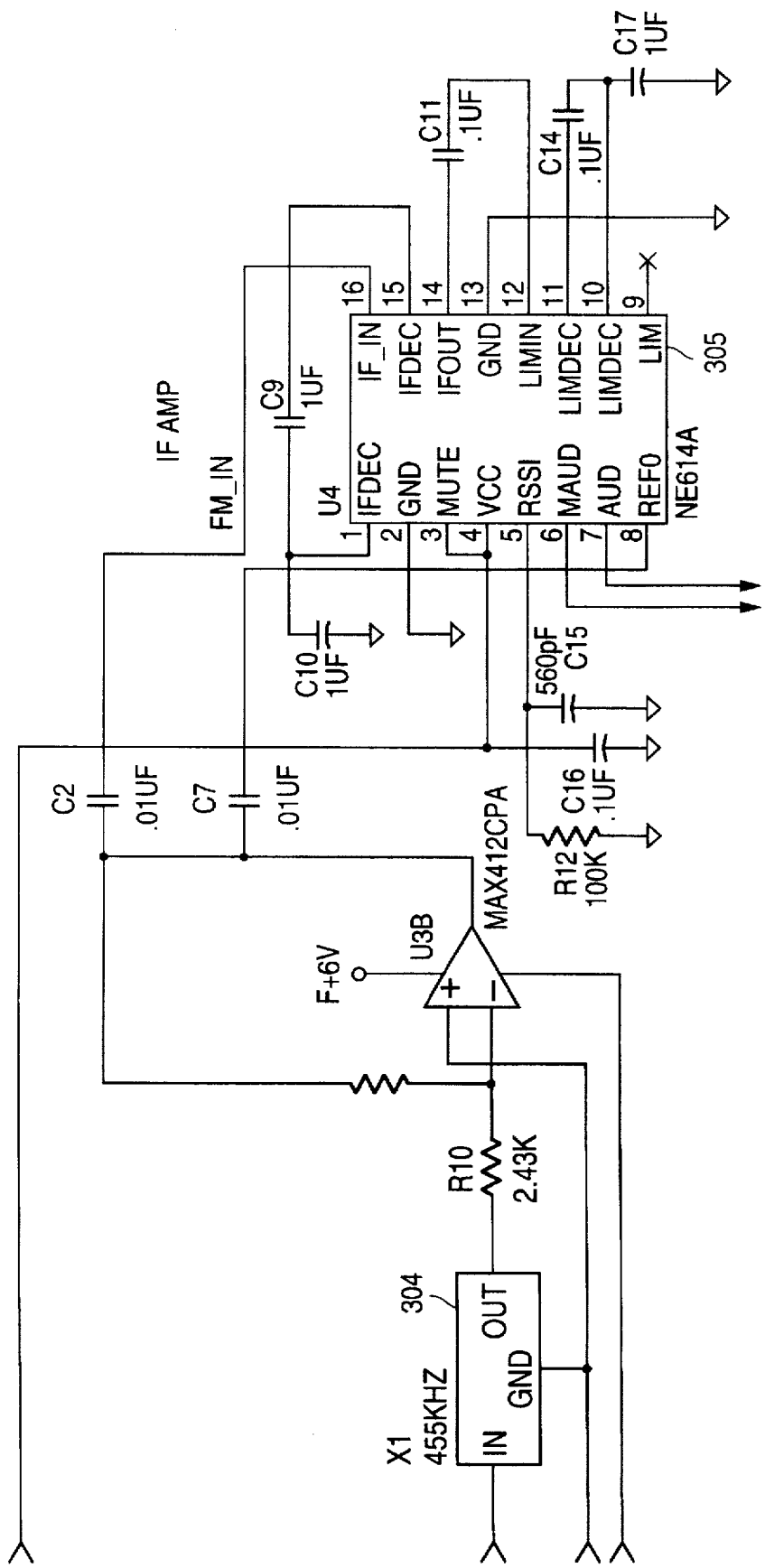

FIGS. 10A and 10B combined are a diagram of another embodiment of a photodetector circuit. The resonant inductor/capacitor circuit 300 in this embodiment is again connected in a negative feedback loop of an operational amplifier 301. A photodetector 302 is coupled to the inverting input of the operational amplifier 301 via a common base coupled bipolar transistor 303. The signal output from the operational amplifier 301 is filtered by a ceramic bandpass filter 304, part number CFU455B2, available from Murata Electronics North America, Inc., of State College, Pa. The filtered signal is again to an FM detector circuit 305 similar to circuit 205 of FIG. 9B. The output node of operational amplifier 301, which is coupled to one end of the resonant inductor/capacitor circuit 300, is electrically isolated from the anode of photodetector 302.

Although the present invention is described in connection with certain specific embodiments for instructional purposes, other versions are possible. For example, active filters other than filters utilizing operational amplifiers can be used, active filters that do not use parallel inductor/capacitor circuits may be used, and quartz crystals and ceramic filters may be used. These and other modifications, adaptations, and combinations of various features of the described embodiments can be practiced without departing from the scope of the invention as set forth in the claims.

What is claimed is:

1. A method comprising:
   receiving radiation A of a first wavelength on a photodetector, the radiation A of the first wavelength being modulated with a modulation signal MA of a first frequency; and
   coupling the photodetector to an active filter tuned to a frequency substantially equal to the first frequency such that the active filter outputs a signal of the first frequency, the frequency to which the active filter is tuned being substantially independent of whether ambient radiation impinges upon the photodetector.

2. The method of claim 1, further comprising:
   receiving radiation B of a second wavelength on the photodetector, the radiation B being modulated with a modulation signal MB of the first frequency, the modulation signal MB having a different phase from the modulation signal MA.

3. The method of claim 2, further comprising:

detecting a phase of the signal output by the active filter.

4. The method of claim 3, further comprising:

transmitting the radiation A and the radiation B onto a plant; and activating a solenoid valve to apply herbicide onto the plant based at least in part on the phase of the signal output by the active filter.

5. The method of claim 1, wherein the active filter comprises an inductor coupled in parallel with a capacitor between first and second nodes, and wherein the photodetector includes a terminal electrically isolated from the first and second nodes.

6. The method of claim 5, wherein the modulation signal MA has a phase, and wherein the signal output by the active filter has a frequency substantially equal to the first frequency, the signal output by the active filter having a phase relationship with respect to the modulation signal MA that is substantially independent of whether the ambient radiation is incident on the photodetector.

7. The method of claim 6, wherein the inductor and the capacitor are connected in a feedback loop of an operational amplifier.

8. The method of claim 1, wherein the ambient radiation is sunlight.

9. An agricultural implement comprising:

a first light source emitting light modulated with a first modulation signal of a first frequency, the first modulation signal having a first phase;

a second light source emitting light modulated with a second modulation signal, the second modulation signal having a second phase different from the first phase;

a photodetector configured to receive light emitted from the first and second light sources, the light having scattered off an object in a field; and an active filter having an input terminal connected to the photodetector and an inductor coupled in parallel with a capacitor such that the active filter is tuned to the first frequency;

wherein the photodetector is not AC coupled in parallel with the inductor.

10. The agricultural implement of claim 9, further comprising:

means for performing a selected activity with respect to the object based at least in part on a phase of a signal output by the active filter.

11. The agricultural implement of claim 10, wherein the object is a plant, and wherein the selected activity is opening a solenoid valve and applying herbicide onto the plant.

12. A system comprising:

a photodetector having first and second terminals, the photodetector configured to receive light and to provide an output signal on the first terminal;

an amplifier including:

an input terminal connected to the first terminal of the photodetector, the amplifier configured to receive the output signal from the photodetector; and a resonant circuit tuned to a selected frequency, the resonant circuit including a capacitance having first and second nodes;

wherein at least one of the first and second terminals of the photodetector is electrically isolated from the first and second nodes of the capacitance of the resonant circuit.

13. The system of claim 12, wherein the resonant circuit further includes an inductor connected between the first and second nodes.

14. The system of claim 12, further comprising a light source configured to provide a beam of the light modulated at the frequency.

15. The system of claim 14, further comprising a second light source configured to provide a second beam of the light modulated at the frequency, wherein the first-mentioned light source is modulated at a first phase different from a second phase at which the second light source is modulated.

* * * * *